United States Patent [19]

Jeffery et al.

[11] 4,245,956
[45] Jan. 20, 1981

[54] COMPENSATING LINKAGE FOR MAIN ROTOR CONTROL

[76] Inventors: Robert A. Frosch, Administrator of the National Aeronautics and Space Administration, with respect to an invention of Philip A. E. Jeffery, Trumbull; Rudolf F. Huber, Shelton, both of Conn.

[21] Appl. No.: 969,755

[22] Filed: Dec. 15, 1978

[51] Int. Cl.³ .............................................. B64C 27/72
[52] U.S. Cl. ................................ 416/114; 244/17.25; 416/500; 74/519
[58] Field of Search ............... 416/114, 115, 162, 500; 74/469, 519; 244/17.25, 17.27, 17.13, 83 J

[56] References Cited

U.S. PATENT DOCUMENTS

| 2,385,881 | 10/1945 | Peterson | 416/114 X |
| 2,599,690 | 6/1952 | Buivid et al. | 416/114 |
| 3,327,552 | 6/1967 | Broders et al. | 74/469 |
| 3,514,054 | 5/1970 | Mard et al. | 244/17.27 |
| 3,908,399 | 9/1975 | Durno et al. | 244/17.25 X |
| 3,999,726 | 12/1976 | Carlson et al. | 244/17.25 X |

*Primary Examiner*—Everette A. Powell, Jr.
*Attorney, Agent, or Firm*—Howard J. Osborn; John R. Manning

[57] ABSTRACT

A compensating linkage for the rotor control system on rotary wing aircraft is disclosed. The main rotor and transmission are isolated from the airframe structure by elastic suspension. The compensating linkage prevents unwanted signal inputs to the rotor control system caused by relative motion of the airframe structure and the main rotor and transmission.

9 Claims, 3 Drawing Figures

COMPENSATING LINKAGE FOR MAIN ROTOR CONTROL

ORIGIN OF THE INVENTION

The invention described was made in the performance of work under a NASA contract and is subject to the provisions of Section 305 of the National Aeronautics and Space Act of 1958, Public Law 85-586 (72 Stat. 435; USC 2457).

BACKGROUND OF THE INVENTION

This invention relates to a helicopter rotor control system which will automatically compensate for unwanted signal inputs due to relative movement between an airframe structure and a rotor and transmission which is isolated from the airframe structure by a hydraulic cushion.

DESCRIPTION OF THE PRIOR ART

The primary sources of vibration in rotary wing aircraft such as helicopters are rotor induced vibratory hub moments and shear forces, and aerodynamic impingement effects of the rotor downwash on the airframe and empennage. These vibrations have adverse effects on subsystem reliability and maintainability and can cause crew and passenger discomfort. Traditionally, blade or hub mounted vibration absorbers have been used to reduce airframe excitations from the vibratory hub moments and shears. Airframe vibration absorbers have also been used to reduce vibration caused by residual hub forces and aerodynamic impingement on the airframe and empennage. Isolation of the transmission and rotor from the airframe is a further means of reducing airframe excitations by the vibratory hub moments and shear forces. Such isolation is effective but results in relative vibratory motion between the rotor and airframe.

The helicopter is controlled by changing the pitch of the rotor blades. The pitch of the rotor blades is changed by means of a swash plate, connected to the rotor blades, which is adjusted by means of a control rod operated from the pilot's compartment. With the rotor isolated from the airframe, relative motion between rotor and airframe, caused by the vibration of the rotor, will cause false control signals to the swash plate actuator.

These false control signals are the result of the movement of an actuator rod, which is connected to the control rod at one end and to the swash plate at the other end, in response to vibrations of the rotor rather than movement of the control rod by the pilot. Any motion of the actuator rod relative to the rotor will cause a signal changing rotor blade pitch. These motions of the actuator rod in response to motions of the control rod are true control signals. Those motions of the actuator rod caused by relative motion of the airframe and the rotor are false signals and must be compensated for.

In prior art various arrangements have been devised to compensate the control signal for the relative vibratory motion of the rotor and the airframe. One prior art method uses a flexible cable rather than a control rod for the input signal to the rotor blades. The flexible cable compensates for the relative vibratory motion of the rotor to the airframe, but other control signal errors are caused by use of a flexible cable, such as friction losses and stretching of the cable. Other methods used to compensate the rotor control signal for relative motion of the rotor and the airframe provide compensation only along some of the three mutually perpendicular axes along which relative translation or about which relative rotation can occur.

It is therefore an object of the present invention to provide a rotor control system which will automatically compensate the control signal to the rotor for relative motion between the rotor and airframe.

A further object of the present invention is to provide compensation to the rotor control for relative movement of the rotor along any of three mutually perpendicular axes, or relative rotation about any of these three axes.

An additional object of the present invention is to provide compensation to the rotor control signal for relative movement between the rotor and the airframe without inducing additional signal error due to such factors as friction.

SUMMARY OF THE INVENTION

According to the present invention, the foregoing and other objects are attained by providing a first rod which transmits a control signal to the inner arm of a summing link. The summing link is attached to the airframe structure by means of a cradle and a pivot. The inner arm of the summing link transmits the control signal via a second rod to a bellcrank. The bellcrank is attached to a bracket on the rotor transmission and transmits the control signal to an actuator rod. The actuator rod operates hydraulic actuators which change the pitch of the rotor blades.

Motion of the rotor and transmission relative to the airframe causes a bracket on the airframe to move a compensating rod to which it is attached. The compensating rod is hollow and is concentric to and exterior to the second rod. The compensating rod's opposite end is attached to the outer arm of the summing link. Motion of the compensating rod causes the summing linkage to adjust the second rod by an equal amount, thus preventing spurious control signals.

BRIEF DESCRIPTION OF THE DRAWINGS

A more complete appreciation of the invention and many of the attendant advantages thereof will be readily apparent by reference to the following detailed description when considered in connection with the accompanying drawings wherein.

DESCRIPTION OF THE PREFERRED EMBODIMENT

Figure 1:
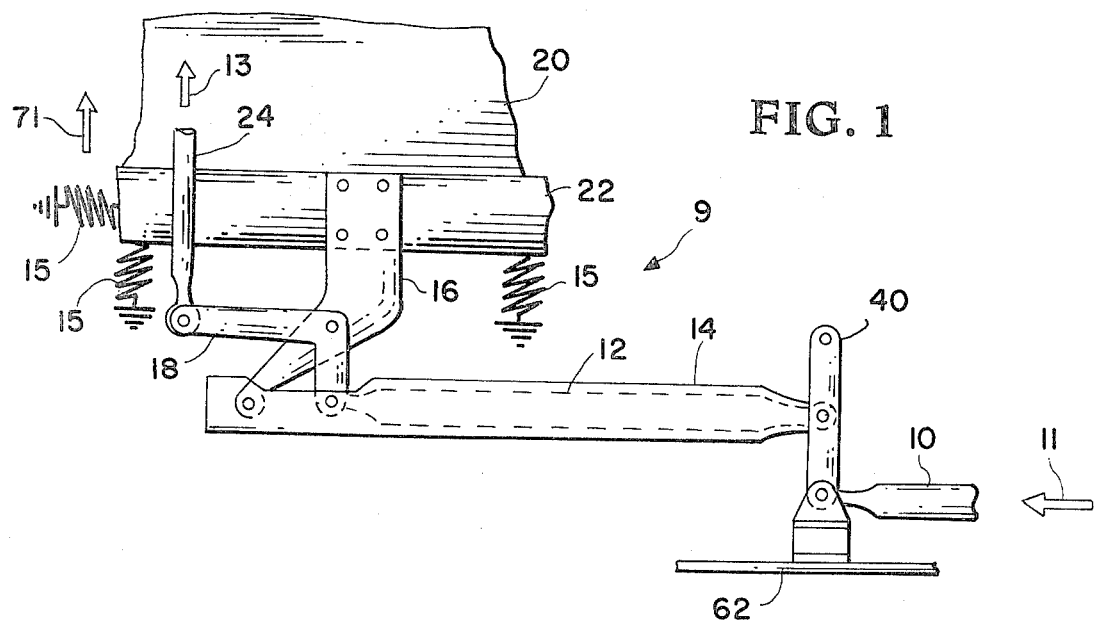
FIG. 1 illustrates a side view, partially in phantom, of the compensating system showing the first rod, the summing linkage, the outer compensating rod, the second rod, the bellcrank, and actuator rod.

Referring now more particularly to the drawings and specifically to FIG. 1, there is shown a side view of one embodiment of the main rotor control compensating linkage designated generally by reference numeral 9. A control rod 10 transmits the rotor control signal from the pilot, shown by arrow 11, to a summing link 40.

Second rod 12 transmits the control signal to an actuator rod 24, approximately perpendicular to second rod 12, by means of a bellcrank 18. The actuator rod 24 transmits the control signal, shown by arrow 13, to the hydraulic actuator for the swash plate, not shown, to change rotor blade pitch.

A bracket 16 is attached by conventional means to a transmission mounting 22. Transmission mounting 22 is isolated from an airframe 62 by hydraulic cushions 15. When the transmission mounting 22 moves relative to airframe 62, bracket 16, which is anchored to one end of compensating rod 14, causes compensating rod 14 to move an equal amount. Compensating rod 14 transmits the compensating signal to summing link 40. Summing link 40 adjusts the second rod 12 by an amount proportional to the amount that the transmission mounting 22 has moved, thus compensating the control signal for relative movement between the transmission mounting 22 and airframe 62. Thus, it appears to the swash plate, which controls rotor pitch, that no relative movement between rotor and airframe has occurred since the actuator rod 24 has been maintained in a constant position relative to the rotor.

Figure 2:
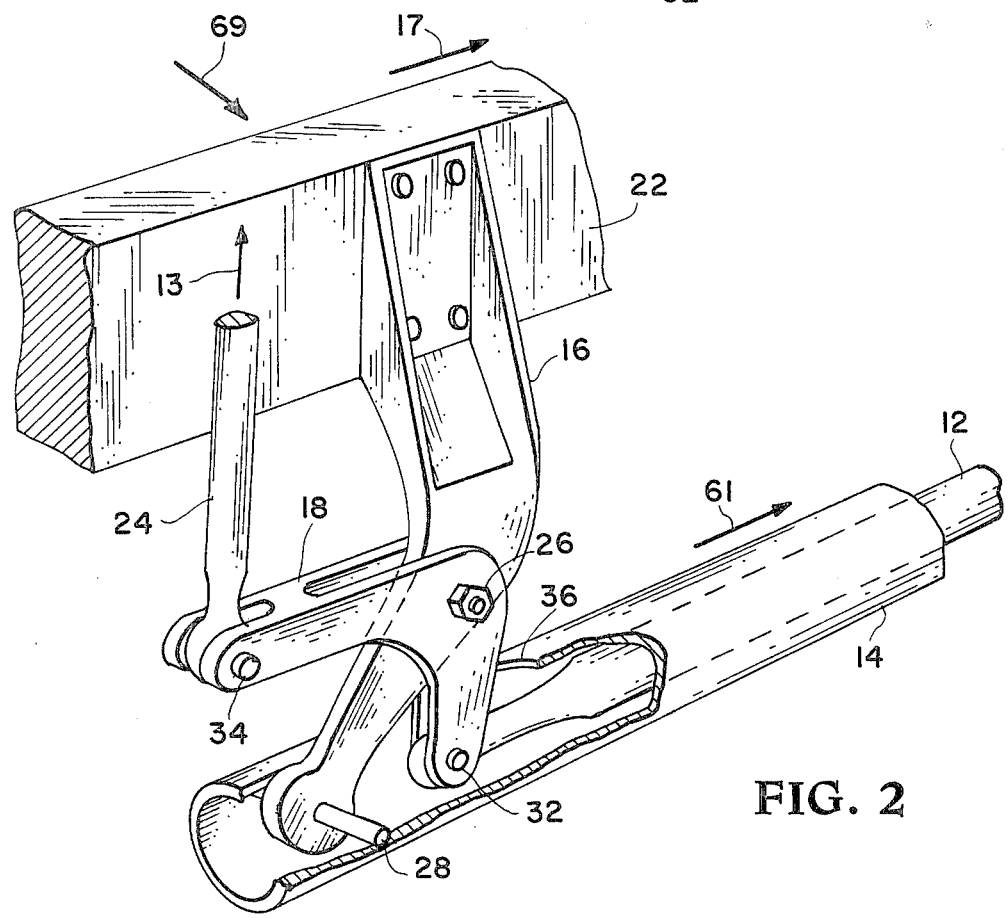
FIG. 2 illustrates a perspective, partially in section, of the bellcrank end of the compensating system shown in FIG. 1.

As shown in more detail in FIG. 2 bracket 16 is attached to compensating rod 14 by means of a pivot pin 28. Pivot 28 allows compensating rod 14 to rotate to accommodate motion of the transmission mounting 22 in a direction parallel to actuator rod 24, shown by arrow 13. Motion of transmission mounting 22 in a direction parallel to compensating rod 14 causes bracket 16 to move the outer compensating rod 14 in the same direction by a proportional amount.

Bellcrank 18 is attached to bracket 16 by a pivot 26. Second rod 12 is attached to one end of bellcrank 18 by pivot 32, and actuator rod 24 is attached to the other end of bellcrank 18 by a pivot 34. Motion of second rod 12 in response to a control signal from the pilot causes bellcrank 18 to rotate at pivot 26, moving actuator rod 24 in a direction perpendicular to the motion of second rod 12.

Figure 3:
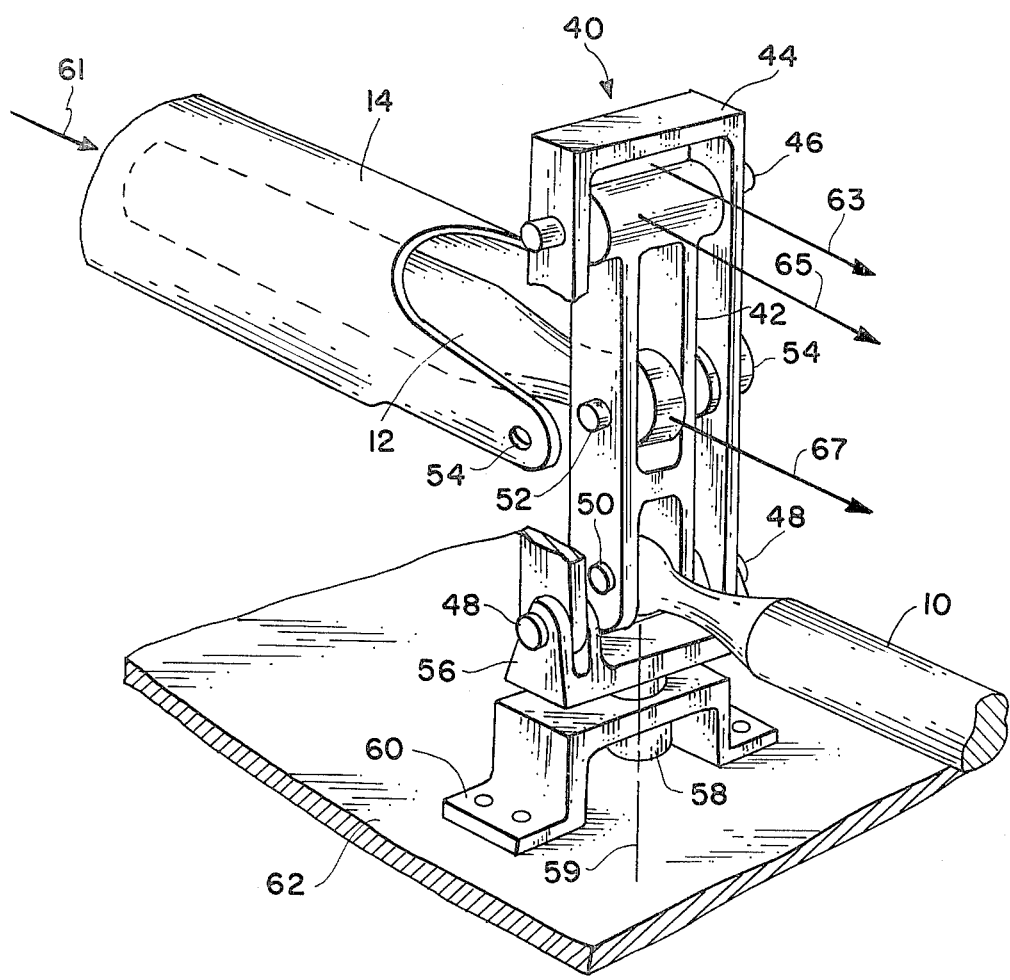
FIG. 3 illustrates a perspective, partially in section, of the summing link end of the compensating system shown in FIG. 1.

FIG. 3 shows the summing link designated generally by reference numeral 40. Summing link 40 is made up of inner summing link 42 and outer summing link 44. Inner summing link 42 and outer summing link 44 are attached at their upper ends by pivot 46. Control rod 10 is attached to the bottom of inner summing link 42 by pivot 50. Motion of control rod 10 in reponse to a control signal from the pilot causes inner summing link 42 to move in the same direction. Inner summing link 42 transmits this control signal to second rod 12, which is attached to the approximate midpoint of inner summing link 42 by pivot 52.

Outer summing link 44 is attached to a cradle 56 by pivots 48. Cradle 56 is attached to a support 60 by pivot 58. Support 60 is attached to airframe structure 62 by conventional means. Pivot 58 allows cradle 56, and hence summing link 40 to rotate about axis 59, which is approximately mutually perpendicular to the axis of control rod 10 and the axis formed by pivots 48.

Compensating rod 14 is attached to the approximate midpoint of outer summing link 44 by pivots 54. Motion of compensating rod 14 in response to relative motion of the transmission mounting 22, as indicated by arrow 61, will cause outer summing link 44 to pivot about pivots 48 and move in the same direction as compensating rod 14 as indicated by arrow 63. As outer summing link 44 moves, it will cause inner summing link 42 to move in the same direction, indicated by arrow 65, since inner summing link 42 is attached to outer summing link 44 by pivots 46. As inner summing link 42 moves, it will cause second rod 12 to move in the same direction indicated by arrow 67, since it is attached to inner summing link 42 at pivot 52. Thus, second rod 12 will move in the same direction as compensating rod 14.

In operation, motion of transmission 20 and transmission mounting 22, relative to airframe 62, shown by arrow 69 in FIG. 2, in a direction mutually perpendicular to the axis of the actuator rod 24 and the axis of second rod 12, causes the rotor control compensating linkage to pivot on cradle pivot 58. Thus, there is no false control signal introduced from this type of motion of the rotor and transmission 20 in relation to the airframe 62.

Motion of transmission mounting 22 in a direction parallel to the axis of second rod 12, shown by arrow 17 in FIG. 2, causes bracket 16 to move in the same direction. Since bracket 16 is attached to one end of compensating rod 14, it forces compensating rod 14 to move in the same direction as transmission mounting 22, shown by arrow 61. Compensating rod 14 is attached to the midpoint of outer summing link 44 and forces outer summing link 44 to move in the same direction as the transmission mounting 22, shown by arrow 63 in FIG. 3. Since inner summing link 42 is attached to outer summing link 44 at the upper end and held in position at its lower end by control rod 10, inner summing link 42 will move in the same direction as outer summing link 44, shown by arrow 63, moving second rod 12 in the same direction, shown by arrow 67. Second rod 12's other end, which is attached to one end of bellcrank 18, will move the end of bellcrank 18 in the same direction that bracket 16 and transmission mounting 22 has moved, thus the position of actuator rod 24 relative to transmission 20 will remain constant and false control signals will be eliminated.

When transmission mounting 22 moves in a direction parallel to the axis of actuator rod 24, shown by arrow 71 in FIG. 1, bracket 16 moves bellcrank 18, and hence actuator rod 24 in the same direction, shown by arrow 13. Thus, since the actuator 24 is moved in the same direction and by the same amount that transmission mounting 22 moved, the actuator 24 does not move relative to transmission mounting 22, and no false signal is introduced.

Since relative rotational movement of the rotor, transmission 20, and transmission mounting 22 about its own axis will produce motions at bracket 16 similar to the relative translational movements described above, the rotor control compensating linkage 9 compensates the control signals for relative rotational movement also.

It will be understood that the foregoing description is of the preferred embodiment of the invention and is therefore merely representative. Obviously there are many variations and modifications of the present invention in light of the preceding teachings. It is therefore to be understood that within the scope of the appended claims the invention may be practiced otherwise than as specifically described.

What is claimed as new and desired to be secured by Letters Patent of the United States is:

1. A rotor control compensating means comprising;
   rotor and transmission means;
   airframe means;

vibration absorbing means connecting said above mentioned means allowing relative motion therebetween;

linkage means for maintaining a rotor control actuator rod means in a fixed position, relative to said rotor and transmission means, during relative movement in all degrees of motion between said airframe and the rotor and transmission means.

2. A rotor control compensating means as in claim 1 wherein said linkage means includes rotor control actuator rod means which transmits a control signal from a pilot to summing means.

3. A rotor control compensating means as in claim 1 wherein said linkage means includes summing means which transmits a control signal from said rotor control actuator rod to a second rod, and adjusts the second rod in response to a compensating rod.

4. A rotor control compensating means as in claim 1 wherein said linkage means includes second rod means and summing means which transmits pilot control signals from said summing means and compensating signals from said summing means to a bellcrank means.

5. A rotor control compensating means as in claim 1 wherein said linkage means includes a bellcrank means and second rod means which transmits a signal from said second rod means to said rotor control actuator rod means.

6. A rotor control compensating means as in claim 1 wherein said linkage means includes a rotor control actuator rod means and bellcrank means which transmits a signal from said bellcrank means to a rotor swash plate.

7. A rotor control compensating means as in claim 1 wherein said linkage means includes a compensating rod means and summing means which transmits a relative motion signal from a rotor transmission to said summing means.

8. A system as in claim 1 wherein said linkage means includes:
a first rod;
an inner summing link, said first rod having one end pivoted to the bottom of said inner summing link so that motion of said first rod causes motion of said inner summing link in the same direction;
an outer, inverter "U" shaped, summing link pivoted at the top of said outer summing link to the top of said inner summing link so that motion of the outer summing link will cause motion of said inner summing link in the same direction;
a cradle supporting and pivoted to the bottom of said outer summing link so said outer summing link may rotate about an axis through the tips of said inverted "U" shaped outer summing link;
a support bracket attached to the relatively stationary body and pivoted to said cradle so said cradle may rotate about an axis that is mutually perpendicular to the axis of said first rod and to the axis of the cradle to outer summing link pivot;
a second rod pivoted to the approximate midpoint of said inner summing link such that motion of said inner summing link causes motion in the same direction of said second rod;
a hollow compensating rod, concentric to but not attached to said second rod, and pivoted to the approximate midpoint of said outer summing link so that motion of said hollow compensating rod causes motion in the same direction of said outer summing link;
a bellcrank pivoted to a bracket on the vibrating body at said bellcrank's approximate midpoint, said second rod having one end pivoted to one end of said bellcrank;
an actuator rod pivoted to the other end of said bellcrank and extending in a direction generally perpendicular to said second rod; and
a bracket attached to the vibrating body and pivoted to said hollow compensating rod so that motion of the vibrating body and said bracket will cause motion in the same direction of said hollow compensating rod.

9. The system of claim 8 wherein the other end of said first rod is connected to a helicopter control member and the other end of said actuator rod is connected to means for varying the pitch of a helicopter rotor blade.

* * * * *